Feb. 5, 1924.
J. A. HALL
1,482,556
DEVICE FOR CONTROLLING DRAWN IMPLEMENTS FROM THE SEAT OF A TRACTOR
Filed April 9, 1921   3 Sheets-Sheet 2
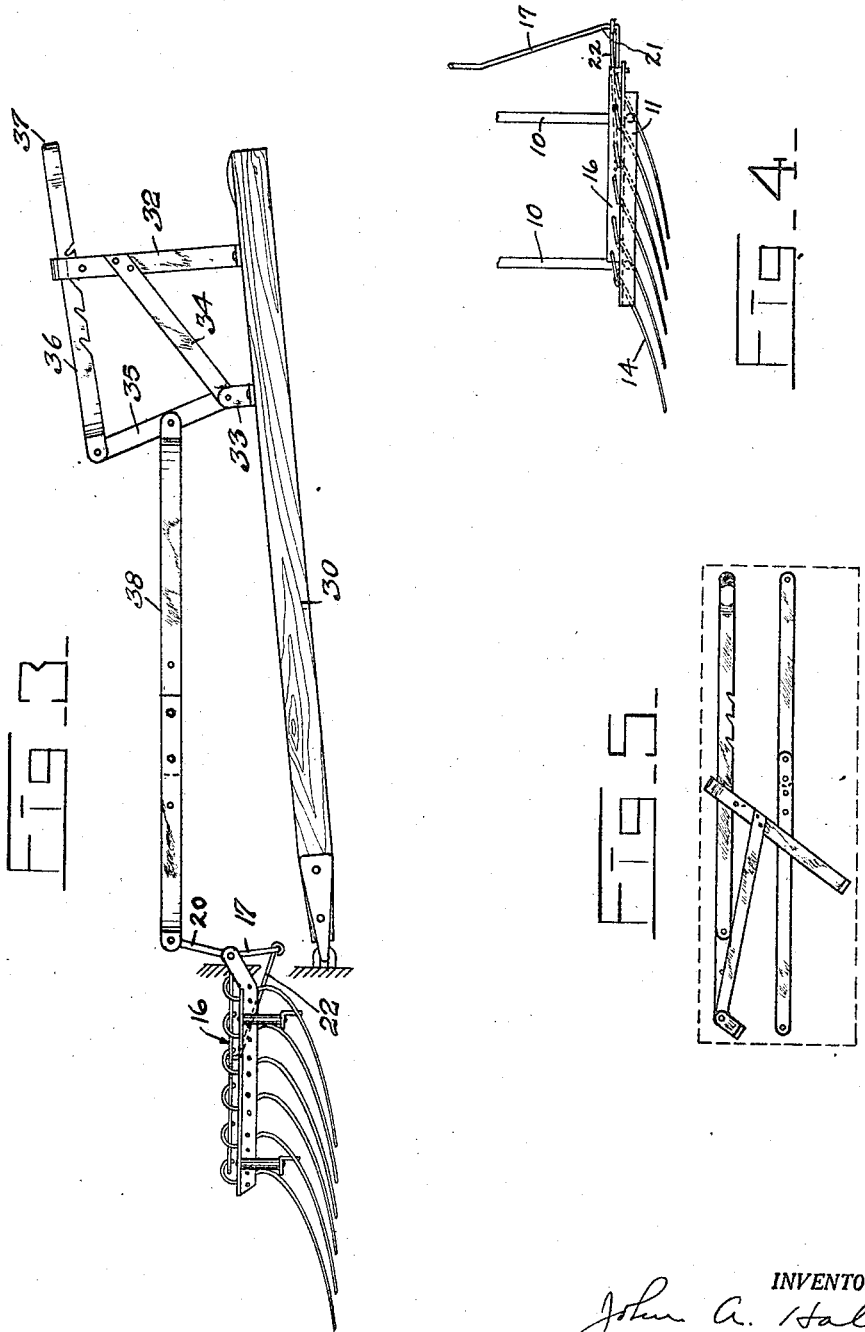
INVENTOR.
John A. Hall,
BY F. K. Fassett,
ATTORNEY.

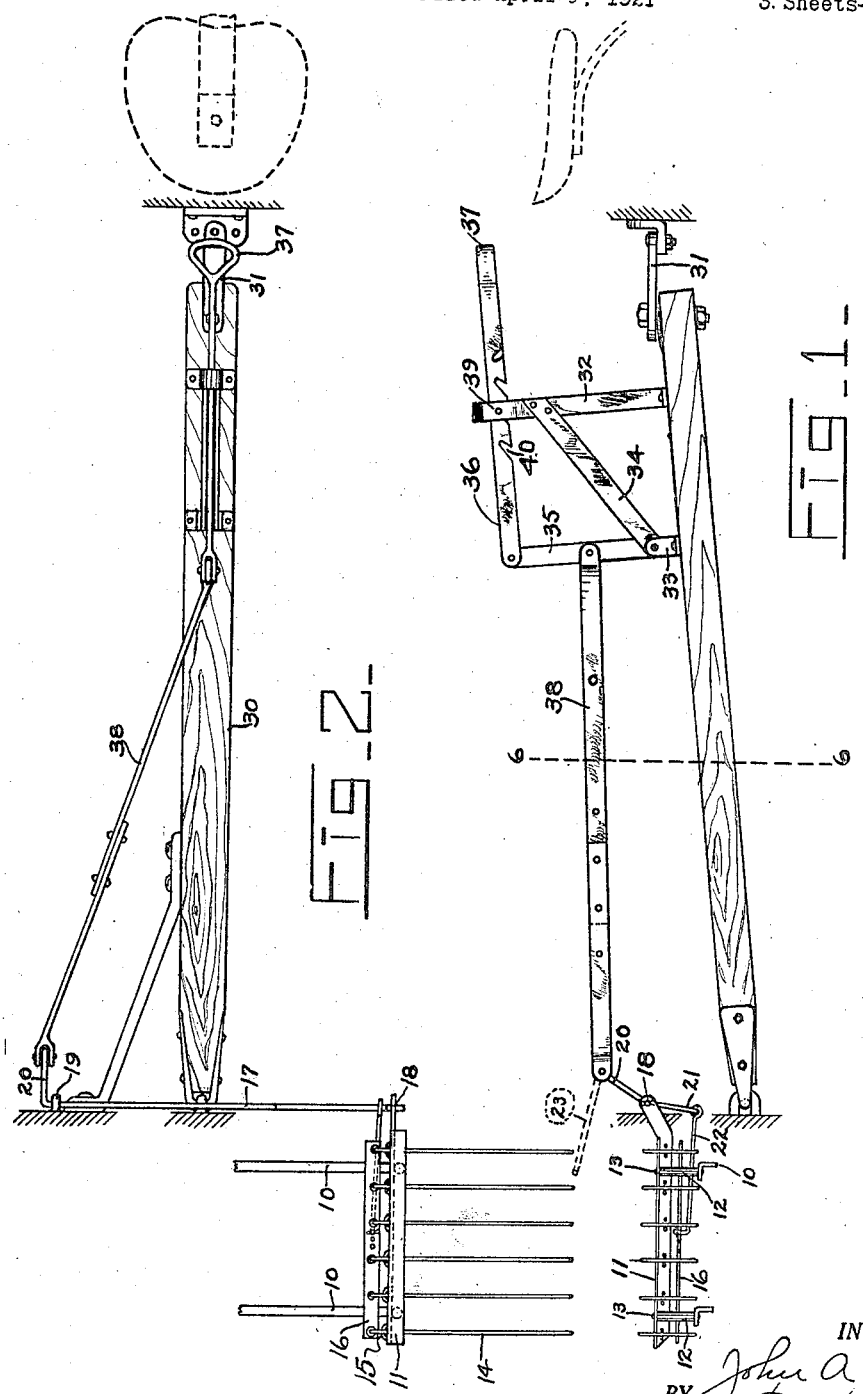

Feb. 5, 1924.  1,482,556
J. A. HALL
DEVICE FOR CONTROLLING DRAWN IMPLEMENTS FROM THE SEAT OF A TRACTOR
Filed April 9, 1921   3 Sheets-Sheet 3
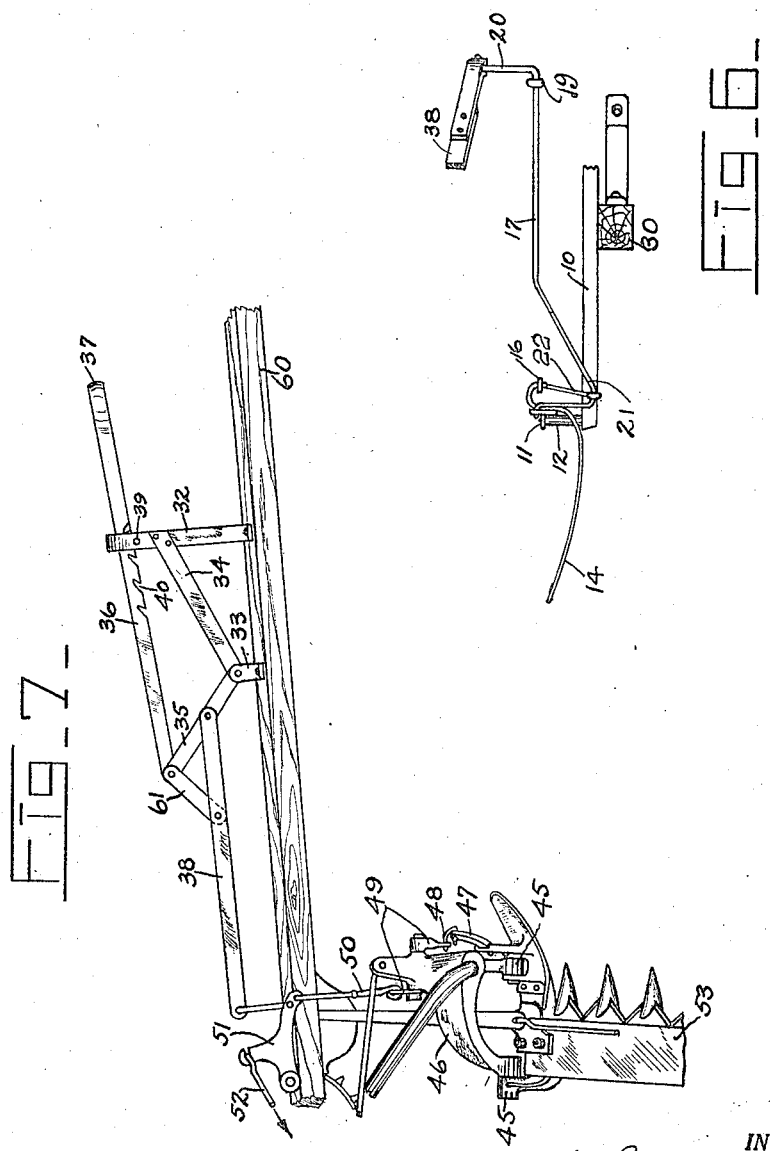
INVENTOR.
John A. Hall,
BY F. K. Fassett,
ATTORNEY.

Patented Feb. 5, 1924.

1,482,556

UNITED STATES PATENT OFFICE.

JOHN A. HALL, OF LEBANON, OHIO.

DEVICE FOR CONTROLLING DRAWN IMPLEMENTS FROM THE SEAT OF A TRACTOR.

Application filed April 9, 1921. Serial No. 460,110.

*To all whom it may concern:*

Be it known that I, JOHN A. HALL, a citizen of the United States, residing at Lebanon, in the county of Warren and State of Ohio, have invented a new and useful Device for Controlling Drawn Implements from the Seat of a Tractor, of which the following is a specification.

My invention relates to devices whereby the driver of a tractor may operate implements which are being drawn thereby from his seat on the tractor.

Notwithstanding the great and manifold advantages derived from the substitution of tractors for horses in drawing farm implements, there has been one important drawback, namely that an extra man has been required to run the tractor. That is, it has required one man to drive the tractor and another to operate the implement. This has been due to two principal causes: (1) implements are mostly made to be drawn by horses, with the driver riding on the implement. The control devices are therefore placed convenient to the driver in his seat, which is frequently, if not in the majority of cases, located at the rear, so that the implement is between the driver and the horses, and (2) the "hitch" by which the implement is attached to the tractor separates the machines so far that controlling devices on the implement are beyond the reach of the tractor driver.

The principal object of my invention is to provide mechanism whereby the tractor driver can control the action of an implement, so that he can drive the tractor and simultaneously operate the control mechanism. For example, when a grain binder is in operation it is necessary to operate the bundle carrier periodically, to drop off the bundles that have accumulated on the carrier and then set the carrier to receive new bundles. One object of my invention is to enable the tractor driver to operate the bundle carrier. Another example is in the case of a mower: It frequently becomes necessary to lift the cutter bar to avoid its striking a stump or other obstruction which might stall or even break the machine. It is my object to enable the driver to lift the bar at will from his seat on the tractor as he formerly did when he rode on the mower.

Another object is to provide a mechanism for the stated purpose, of such character that it can be marketed as an article of manufacture, to be applied by the purchaser to his own machinery, the mechanism being so constructed that it can be applied with substantially no change in the existing machines.

Another object is to provide a mechanism of such character that it can be folded into a compact form, enabling it to be shipped in a comparatively small box, by express or even parcel post.

In the accompanying drawings,

Figure 1 is an elevational view showing my device mounted on a tractor hitch and connected to the bundle carrier mechanism of a grain binder.

Figure 2 is a plan view of the same parts as those shown in Figure 1.

Figure 3 is a view similar to Figure 1, but with portions omitted, showing the parts in the position they are allowed to assume to dump a load of bundles.

Figure 4 is a plan view of the carrier, showing a portion of my device with the parts in the position they occupy in Figure 3.

Figure 5 illustrates the arrangement of the parts of my device for shipment, the dotted rectangular frame surrounding the parts representing a box in which the parts are enclosed.

Figure 6 is a view taken on line 6—6 of Figure 1.

Figure 7 shows my device applied to a mower for the purpose of lifting the cutter bar.

Referring now to the views concerned, I will first briefly describe the bundle carrier to which my device is attached, it being understood, however, that the carrier is not part of my present invention. Extending horizontally from the frame of the binder (not shown) are two angle iron bars 10, to which are attached a horizontal angle iron bar 11, this bar 11 being raised above the bars 10 by tubular spacers 12, through which the rivets 13 for holding the bars together pass. A number of carrier arms 14, are attached to the vertical member of the angle 11 by fixtures 15, which are so constructed that when the arms extend squarely from the bar 11, as in Figures 1 and 2, their ends are elevated as in Figure 6, so as to prevent bundles of wheat from falling off of the carrier, while when the arms are swung around, as in Figures 3 and 4, the arms drop and allow the bundles to slide off to the ground. The arms 14 are provided with rearward extensions, connected to a bar 16, which bar is moved longitudinally to and fro to operate the carrier; that is, to move the arms from one position to the other. For moving the bar 16 a round rod 17 is provided. This rod is journaled at 18 in the bar 11, and at 19 in a bearing fixed to the frame of the binder. Adjacent to the bearing 19 the rod is bent upward to form a lever 20 for rocking the rod. Close to its bearing 18 the rod 17 is bent downward, forming a loop 21, which acts as a crank, and to which a pitman 22 is attached, the other end of the pitman being connected to the bar 16. Normal operation of the carrier is effected through a rod 23 shown in dotted lines in Figure 1, which is attached to the end of the lever 20 and extends to an operating lever or the like located near the driver's seat, not illustrated at the rear of the binder.

To couple the binder to a tractor a tongue 30, commonly called a hitch, is attached to the binder, and at 31 this hitch is coupled to the tractor. Only the driver's seat and the draw head of the tractor are shown in the drawings, these being in approximately their correct relative positions. I will now describe my device whereby the driver of the tractor is enabled to operate the bundle carrier, thus dispensing with the man who heretofore has been required in the driver's seat on the binder:

On the hitch I mount a bracket consisting of a long and a short upright, 32 and 33, which are tied together by an oblique brace 34. A lever 35 is pivotally attached to the upright 33, and at the upper end of the lever a pull rod 36 is pivotally attached. This rod passes through a guide loop formed on the end of the upright 32 and at its free end is provided with a handle 37. A rod 38 is pivotally connected to the lever 35 and the other end of this rod is connected to the lever 20. The rod 23, shown in dotted lines in Figure 1, may be detached and the rod 38 connected in its place to the lever 20. By means of a pin 39, which passes through the loop, and notches 40 in the edge of the rod, the rod 36 may be latched to the upright in any desired position. For the purpose of adapting the rod 38 to various implements it is made in two parts so that its length may be varied.

It is obvious that the driver of the tractor, from his seat, can unlatch the handle and push it from him, thereby swinging the carrier arms to the position shown in Figure 3, and as soon as the bundles have dropped off he can pull the rod toward him, restoring the carrier arms to their normal position, and by latching the pull rod 36 to the upright the carrier is maintained in normal condition, ready to receive new bundles of grain. The attachment of the hitch to the binder is substantially rigid, and since the bracket to which the rod 36 is attached is fixed to the hitch, it follows that the latch 39—40 of my device is as effective for holding the bundle carrier in normal condition as is the regular mechanism for this purpose, carried by the binder. That is, notwithstanding the handle 37 is brought within reach of the man sitting in the tractor seat, the efficiency of the bundle carrier, and the facility with which it can be manipulated, is fully maintained. And this is true whatever position the tractor may occupy with reference to the binder, even in turning a corner, for example.

The main advantage of using my device is, of course, that it dispenses with one man. Another advantage is that the operation of the binder can be observed better from the tractor seat than from the driver's seat on the binder. This is because most of the mechanism of the binder is in front where it cannot be seen from the binder seat.

In Figure 7 my device is shown slightly modified and applied to a mower for the purpose of lifting the cutter bar. The cutter bar is hinged at 45—45 to a portion 46 of the mower frame, and through medium of an arm 47, link 48, bell-crank 49, link 50, bell-crank 51 and rod 52, the driver of the mower is enabled to lift the cutter bar by a lever adjacent to the driver's seat. Usually there is a spring arranged to exert a pull on the rod 52 in the direction of the arrow, so that the weight of the cutter bar 53 is partially neutralized. Now to operate the cutter bar with my device I mount my bracket, the same as has been described, on the mower hitch 60. The modification consists in tying the levers 35 and bar 38 together by a link 61, so that the bar 38 becomes in effect a part, or extension, of the lever 35. It is understood that the handle 37 is adjacent to the tractor driver's seat, and it is seen that by pulling the handle 37 toward him the driver will raise the lever 35—38 and effect just the same result as a man in the mower seat would when he operated the mechanism by which a pull is exerted on the rod 52. In each case the bell-crank is rocked and the cutter bar 53 lifted. In both cases the spring referred to but not shown affords assistance in lifting the bar.

It is needless to multiply the examples of uses to which my device can be put, as it is obvious that it may be applied to various uses, where an implement or the like is drawn by a tractor and there is some mechanism on the drawn implement to be operated by the driver from his seat on the tractor. For example, where the tractor is drawing a freight carrying trailer my device can be arranged to operate the brakes on the trailer. It has been seen that the device can be applied without changing an implement, at least without change that cannot be effected by any farmer, so the device can be sold separately from either the implement or tractor, to be mounted by the purchaser in a manner to suit his own needs.

I do not wish to limit myself to the particular structural features shown, as it is evident that various ways may be found to effect the purposes I have disclosed.

What I claim as new and desire to secure by Letters Patent is as follows:

1. In a device of the character described, the combination of a hitch for connecting a farm implement to a tractor, control mechanism on the implement, comprising an element which when moved in a characteristic manner is capable of operating said mechanism, a rod connected to said element and to a lever fulcrumed on the hitch, a substantially horizontal pull rod connected to said lever and provided at its free end with a handle, a guiding bracket mounted on the hitch, whereby said rod is supported with the handle within reach of the driver of the tractor while in his seat, and a notch and pin arrangement whereby to lock the rod to the bracket in desired positions.

2. A device for the purpose described, consisting of two uprights, one comparatively short and the other long, each provided with a flange to be attached to a tractor hitch; an oblique brace extending from the long upright down to the short one, whereby the former is stabilized, a lever pivoted to the short upright, a rod pivotally attached to said lever, the free end of said rod passing through a guide on the upper end of the long upright, a notch and pin arrangement for latching said rod in required positions with respect to the long upright, said lever and rod being capable of being moved into a position in alignment with each other and into approximate alignment with said brace.

3. In a device of the character described, for the purpose of operating the control mechanism on an implement, which mechanism comprises an element to be rocked to and fro; a hitch to connect said implement to a tractor, means connecting the hitch to the implement at a point removed, laterally, from said rocking element, a lever fulcrumed on the hitch, a rod extending diagonally from said lever to said element, said rod being pivotally attached to said lever and element, a pull rod connected to said lever, with its free end accessible to the driver of the tractor, and notch and pin locking means for locking the pull rod in various positions, whereby to hold said rocking element in any desired position.

JOHN A. HALL.